United States Patent [19]
Lary et al.

[11] Patent Number: 5,386,514
[45] Date of Patent: Jan. 31, 1995

[54] QUEUE APPARATUS AND MECHANICS FOR A COMMUNICATIONS INTERFACE ARCHITECTURE

[75] Inventors: Richard Lary, Colorado Springs, Colo.; Robert Willard, Andover; Catharine van Ingen, Shrewsbury, both of Mass.; David Thiel, Colorado Springs, Colo.; William Watson, Redmond, Wash.; Barry Rubinson, Danville, Calif.; Edward A. Gardner, Colorado Springs, Colo.; Verell Boaen, Groton, Mass.

[73] Assignee: Digital Equipment Corporation, Maynard, Mass.

[21] Appl. No.: 869,648

[22] Filed: Apr. 16, 1992

[51] Int. Cl.⁶ ............................................. G06F 13/00
[52] U.S. Cl. .................................................... 395/250
[58] Field of Search ................ 395/200, 275, 250, 325

[56] References Cited

U.S. PATENT DOCUMENTS

| | | | |
|---|---|---|---|
| 3,487,375 | 12/1969 | Macon et al. | 340/172.5 |
| 4,035,777 | 7/1977 | Moreton | 364/200 |
| 4,387,427 | 6/1983 | Cox et al. | 364/200 |
| 4,419,728 | 12/1983 | Larson | 364/200 |
| 4,449,182 | 5/1984 | Rubinson et al. | |
| 4,751,634 | 6/1985 | Burrus, Jr. et al. | 395/275 |
| 4,777,595 | 10/1988 | Strecker et al. | 364/200 |
| 4,829,425 | 5/1989 | Bain, Jr. et al. | 364/200 |
| 4,897,786 | 1/1990 | Pimm et al. | 364/200 |
| 4,939,636 | 7/1990 | Nakagawa et al. | 364/200 |
| 4,956,771 | 9/1990 | Neustaedter | 364/200 |
| 4,958,277 | 9/1990 | Hill et al. | 364/200 |
| 4,975,829 | 12/1990 | Clarey et al. | 364/200 |
| 5,070,477 | 12/1991 | Latif | 395/325 |

FOREIGN PATENT DOCUMENTS 0206657 12/1986 European Pat. Off. .

OTHER PUBLICATIONS

Publication, "CSR Architecture (DMA Processors), and Optional Framework for DMA-Processors Architectures" draft 1.0 by P1212 Working Group of the Microprocessor Standards Committee, Standards Subcommittee of the Technical Committee on Microprocessor and Microcomputers of the IEEE Computer Society, Jan. 31, 1990 at pp. 4–12.

Collier et al., "Queued Communication Interface"; IBM Techical Disclosure Bulletin vol. 19, No. 1, Jun. 1976, New York, US pp. 217–221.

*Primary Examiner*—Robert L. Richardson
*Attorney, Agent, or Firm*—Cesari and McKenna

[57] ABSTRACT

A communication interface between a port driver and an port adapter of a host computer includes a singly-linked queue resident in a host memory of the computer. The queue includes a header element and a stopper element with message entries linked therebetween. The message entries contain information to be exchanged between the port driver and port adapter. Each message entry includes at least a carrier that contains a forward link pointer to the next entry in the queue and message/-response specific control information. The stopper element identifies the end of the queue and is distinguishable from a message entry by a valid indicator, e.g., the state of at least one bit of the forward link pointer. Functionally, the stopper entry allows the port driver and port adapter to concurrently insert and remove message entries of the singly-linked queue in a reliable manner without the use of any external synchronization mechanism.

16 Claims, 15 Drawing Sheets

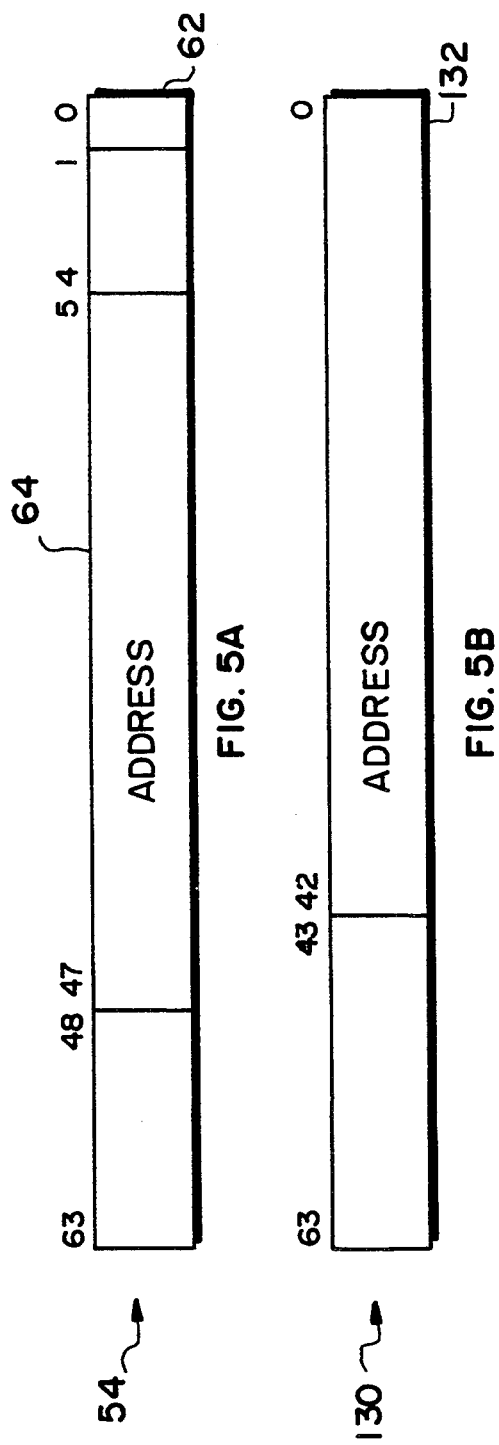

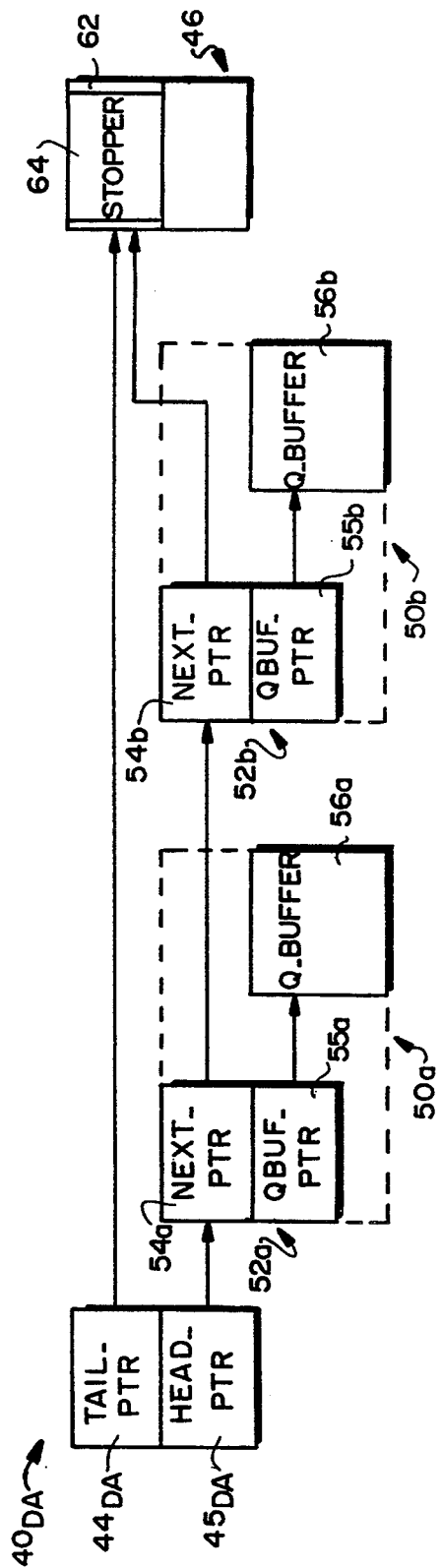
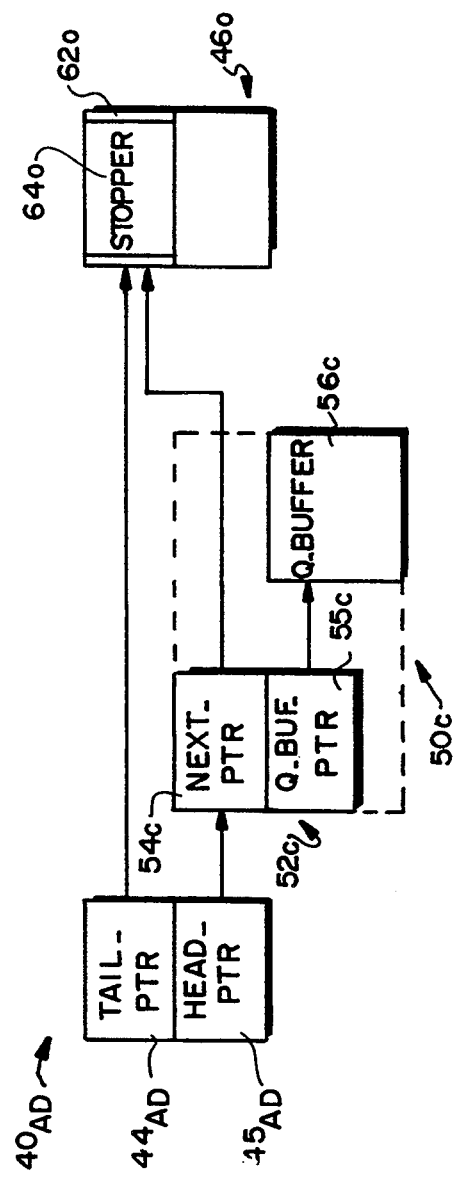
FIG. 8A

QUEUE APPARATUS AND MECHANICS FOR A COMMUNICATIONS INTERFACE ARCHITECTURE

FIELD OF THE INVENTION

This invention relates generally to communication within a host computer and, more specifically, to a communication interface between a software port driver and a hardware port adapter.

BACKGROUND OF THE INVENTION

A data processing system typically comprises a host computer connected to one or more nodes, e.g., other host computers or peripheral devices, via an interconnect medium. The host computer comprises a number of basic elements including a central processing unit (CPU), a host memory and an input/output (I/O) port adapter that physically connects the computer to the interconnect medium. In general, the interconnect medium is typically a network or I/O bus, and the peripheral devices are typically disks, tapes and communications equipment.

The computer is functionally organized by an operating system comprising a collection of software modules that control the execution of computer programs and manage the transfer of information among the elements of the computer. The host memory stores computer program information, i.e., data and instructions, in addressable storage locations. The CPU then executes the programs by fetching and interpreting the instructions, and processing the data in accordance with the instructions.

The operating system includes a port driver that controls the port adapter when performing I/O operations, such as the transfer of information between the host computer and a node. In order to efficiently perform these operations, the port driver and port adapter exchange messages, e.g., commands and responses. Specifically, the driver sends a command to the port adapter to perform an operation and the port adapter returns a response to the driver. To facilitate this exchange, the driver and adapter typically communicate via locations in the host memory that are accessible by both the port driver, i.e., the CPU, and the port adapter. These locations are organized to provide data structures such as rings or interlocked queues.

A ring structure is typically implemented in entries contained in contiguous memory locations. These locations are allocated by the port driver at system initialization. A synchronization mechanism, such as a bit within each ring entry or a set of pointers, is included to identify "ownership" by either the adapter or the driver. Specifically, the port driver inserts a command into an entry location and sets the ownership mechanism to indicate ownership by the port adapter. The port adapter eventually retrieves the command and then changes the ownership mechanism to indicate ownership by the driver. This informs the driver that the command has been retrieved by the port adapter and that another command may be inserted into that location. In essence, this is a removal of that entry from the ring.

Insertion and removal of entries occur in sequence, typically with the use of two pointers, i.e., one to identify the next entry to be retrieved and another to identify the next location for entry insertion. As a result, the driver and adapter typically operate on entries physically located close to one another and usually within the same memory block. This may lead to "cache" contention between the driver and port adapter if the port adapter attempts to copy the block into its own buffer memory.

Because of the contiguous memory location nature of the ring entries, the driver must allocate a sufficient number of ring entries during initialization. Specifically, if too many entries are allocated, memory is wasted; if too few entries are allocated, a temporary imbalance between the insertion and removal rates can cause ring overflow and slow down the execution of the port driver and other software components that use the ring.

In contrast to a ring structure, the entries of an interlocked queue do not necessarily occupy consecutive locations in host memory. Rather, each entry contains a forward link pointer indicating the memory location of the next entry in the queue. Therefore, the port driver may "dynamically expand" the size of the queue, i.e., allocate an additional queue entry, by inserting a pointer in the queue, indicating the location of a new entry. This does not stall computer operation or waste memory.

The interlocked queue also has a synchronization mechanism that allows either the port adapter or driver to "lock" or maintain ownership of a queue for the purpose of inserting or removing entries; the mechanism is typically an interlock bit that identifies ownership of the entry. However, the interlocked queue requires many host memory references to insert and remove the entries. In general, insertion of an entry into the queue requires at least five memory operations by the port adapter: two operations to perform an interlock of the queue header to set the interlock bit; at least one operation to adjust the various pointers of the entries in the queue; and two operations to perform another interlock to clear the bit in the queue header. These memory operations occur serially, thus providing a significant component of port adapter processing overhead.

Therefore, it is desirable to provide a communication queue apparatus having a structure and mechanics that avoid the foregoing difficulties by allowing concurrent insertion of entries by a first entity, such as either a port driver or an port adapter, and removal by the other entity without the need for an external synchronization mechanism.

In addition, it is desirable to provide a one-way communication interface between the entities that, in one aspect of the invention, minimizes the frequency with which one entity accesses the communication queue apparatus to exchange information with the other entity.

Furthermore, it is desirable to provide a two-way communication interface between the entities that, in another aspect of the invention, reduces the overhead associated with exchanging information between the entities.

SUMMARY OF THE INVENTION

Briefly, the invention provides an efficient communication interface between a port driver and an port adapter via a singly-linked queue resident in the memory of a host computer. The singly-linked queue apparatus comprises a header element and a termination or "stopper" entry, with message entries linked therebetween. The message entries contain information to be exchanged between the port driver and port adapter.

The structure of the singly-linked queue may be incorporated in a driver-to-adapter (D-A) queue used to pass messages, such as commands, from the port driver to the port adapter, and in an adapter-to-driver (A-D) queue used to pass responses from the port adapter to the driver.

Specifically, the header element contains a first pointer, $TAIL_{13}$ PTR, to the stopper entry located at the end of the queue and a second pointer, HEAD_PTR, to the first message entry located at the beginning of the queue. Message entries are inserted onto the end of the queue using the first pointer TAIL_PTR and removed at the beginning using the second pointer HEAD_PTR. In addition, insertion and removal of the message entries may be performed in first-in, first-out (FIFO) order. Each message entry includes at least a carrier that contains a forward link pointer to the next entry in the queue and message/response specific control information. In one embodiment of the invention, the message entry may also include a queue buffer, Q_BUFFER, that stores the actual message/response specific control information. In this embodiment, the carder also contains a pointer to the Q_BUFFER. The use of a separate carrier and Q_BUFFER permits independent reuse of the structures.

The stopper entry identifies the end of the queue. Although it is generally similar in structure to a message entry, the stopper is not a valid message entry and is distinguishable from a message entry by a "valid" indicator, e.g., the state of at least one bit of the forward link pointer. An advantage of the invention is that the stopper entry allows the port driver and port adapter to concurrently insert and remove message entries of the singly-linked queue in a reliable manner without the use of any external synchronization mechanism. This is possible, in part, because the stopper is one entry beyond the last message entry. For example, to insert a message entry onto the queue, an entry having its valid indicator configured as a "new" stopper entry is appended to the end of the queue, immediately following the "old" stopper. The old stopper, which eventually becomes the new message entry, is maintained as a stopper until all of its information fields have been updated, so as to avoid a situation where incorrect information is retrieved. This technique also prevents simultaneous contention for the entry by the driver, which may be "inserting" entries onto the queue and the port adapter, which may be "removing" them. Once the message information is completed, the entry is made valid by configuring the valid indicator to identify a valid message entry. Thereafter, the message entry may be removed from the queue.

In addition, the use of the valid indicator depends upon the entry and queue. Because of the varying use of the valid indicator, to respond to a message entry issued by the port driver on the D-A queue, the port adapter need only update the forward link and Q_BUFFER pointers of the "old" stopper entry in the A-D queue; it then becomes a "new" response entry, while the "old" message entry becomes the "new" A-D queue stopper. This is illustrated below.

The port driver passes a message to the port adapter through a message entry on the D-A queue. Specifically, the driver inserts the message entry onto the D-A queue by adding a new stopper entry and transforming the old stopper into an active message entry. As noted, transformation of the old stopper into a message entry is performed last to ensure correct information is transmitted. The port adapter then performs a read operation in host memory to obtain the carrier of the first message entry, and locate the next entry and the current Q_BUFFER. Thereafter, the port adapter performs a read operation in the Q_BUFFER to acquire the specific message. The message, which is typically executed by the port adapter, may specify a response from the adapter acknowledging receipt of the message. If so, the port adapter performs a write operation to insert the appropriate pointers in the "old" stopper entry on the A-D queue. The Q_BUFFER pointer is updated to reference the Q_BUFFER, while the forward link pointer is updated to reference the previous message carrier. Since the stopper indicator is inverted between the D-A and A-D queues, the previous message carrier then becomes the new A-D queue stopper without having to modify the indicator. This optimization technique eliminates a write operation.

An advantage of the invention is that the singly-linked queue arrangement retains the dynamic expandability of interlocked queues while minimizing the port adapter accesses to main memory, thereby reducing the number of overhead read and write operations necessitated by previously known queue structures. Two accesses to host memory are required to remove an entry from the singly-linked D-A queue, e.g., a read operation of the carrier and another read of the Q_BUFFER. One access to host memory is required to return a response on the A-D queue, e.g., a write operation to that carrier. This represents a material improvement in efficiency compared to the previously known interlock queues. In addition, the structure and mechanics of the singly-linked queue support a difference in the granularity or size of such accesses to host memory as between the port adapter and the CPU.

Another advantage of the invention is that the singly-linked queue apparatus achieves expandability of known queues without requiring use of memory interlocks, thereby eliminating interlock contention. Moreover, the singly-linked queue described herein eliminates latency associated with overflow in rings, while the non-contiguous nature of queue elements throughout host memory reduces cache contention between the CPU and I/O port adapter. In addition, an advantage of the invention is that the singly-linked queue apparatus is always "self-consistent"; that is, either the port adapter or port driver; functioning as an inserter or remover, may always poll the queue on its own to exchange message entries, without the use of any external synchronization mechanism.

Therefore, in accordance with the invention as embodied and broadly described herein, an apparatus is provided for exchanging information between a port driver operating system program executed by a CPU of a computer and an I/O port adapter. The apparatus of the invention comprises: (A) singly-linked queue means located in a host memory for inserting and removing the information for exchange between the driver and the port adapter, and including carrier means for enclosing the information for exchange between the driver and the port adapter, first stopper means for referencing an end of the queue and including indicator means adapted to be asserted for distinguishing the stopper means from the carrier means, and means for referencing a beginning of the queue; (B) means for inserting the carrier means at the end of the queue, and (C) means for removing the carrier means from the beginning of the queue. In one aspect of the invention, the inserting means further comprises means for allocating a second stopper means in host memory, and means for transforming the first stopper means into the carrier means, such that the second stopper means identifies the end of the queue. As a result of this invention, the information contained in the carrier means is exchanged between the driver and the port adapter in a reliable manner without the use of an external synchronization mechanism.

BRIEF DESCRIPTION OF THE DRAWINGS

The above and further advantages of the invention may be better understood by referring to the following description in conjunction with the accompanying drawings, in which:

FIG. 5A depicts the various fields of a forward link pointer of the singly-linked queue of FIGS. 4A and 4B;

FIG. 5B depicts the format of the various fields of a control/status insertion register;

FIGS. 8A-8E are diagrams illustrating the removal of an entry from a singly(linked queue and subsequent insertion of an entry into another singly-linked queue in accordance with the invention.

DETAILED DESCRIPTION OF ILLUSTRATIVE EMBODIMENTS

Figure 1:
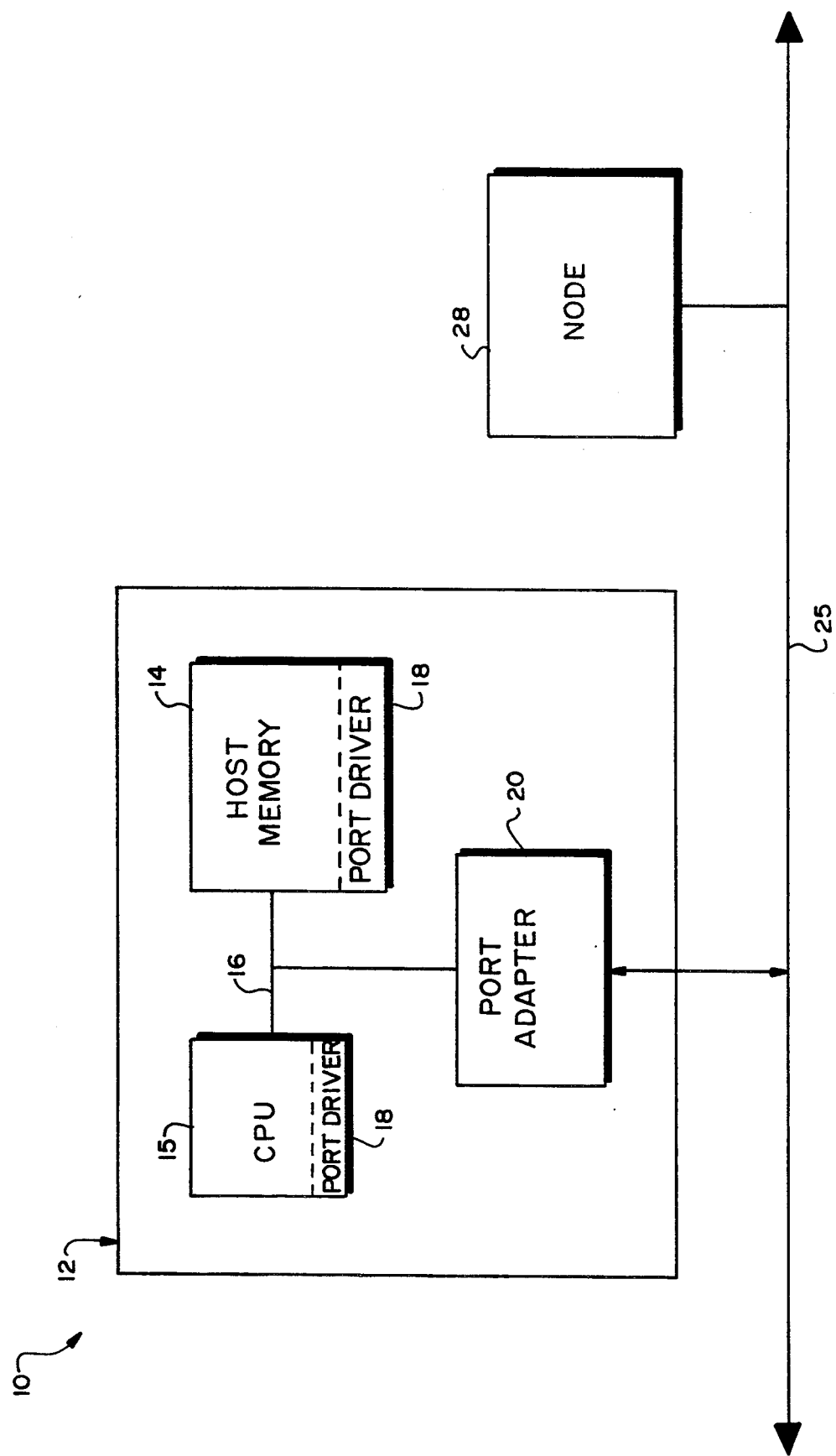
FIG. 1 is a diagram of a data processing system including a node connected to a host computer having an I/O port adapter, a CPU and a memory for storing at least portions of a port driver operating system program that is executed by the CPU.

FIG. 1 illustrates a data processing system 10 that includes a host computer 12 connected to at least one node 28 via an interconnect medium 25. Node 28 may be another host computer or a peripheral device, such as a disk drive, whereas the interconnect medium 25 is typically a network or an input/output (I/O) bus. The host computer 12 may comprise a central processing unit (CPU) 15, a host memory 14 and an I/O port adapter 20 interconnected by a system bus 16. The host memory 14 may comprise storage locations typically composed of random access memory (RAM) devices, which are addressable by the CPU and port adapter. An operating system, portions of which are typically resident in host memory 14 and executed by CPU 15, functionally organizes the computer 12. The operating system includes, inter alia, a port driver 18 executed by the CPU 15 to control the port adapter 20. The driver 18 is responsible for invoking I/O operations in support of programs executing in the CPU 15. The driver 18 and port adapter 20 communicate by "reading" and "writing" various data structures resident in the host memory 14. It is to be understood that the CPU 15 performs the actual read and write operations on behalf of the driver, whereas the port adapter 20 incorporates the necessary "intelligence" to perform similar operations itself.

If, for any reason, the host computer 12 desires to communicate with the node 28, the port driver software issues an appropriate I/O message, e.g., a command, to the port adapter 20. As will be described in detail herein, the adapter 20 interprets the message received from the driver 18, executes it by, for example, forwarding it to the appropriate node on the medium 25, and then responds to the port driver 18, if necessary. Later, the port adapter 20 may receive a message from node 28 specifying, for instance, data requested by the host computer 12. Because the message contains information necessary to locate a data buffer in host memory 14, the port adapter 20 transfers the data to the appropriate buffer location and notifies the port driver 18. The port adapter 20 may also receive unsolicited message packets from other nodes connected to the interconnect medium 25. The adapter 20 may treat the incoming packets as messages to itself or pass them to the driver.

Figure 2:
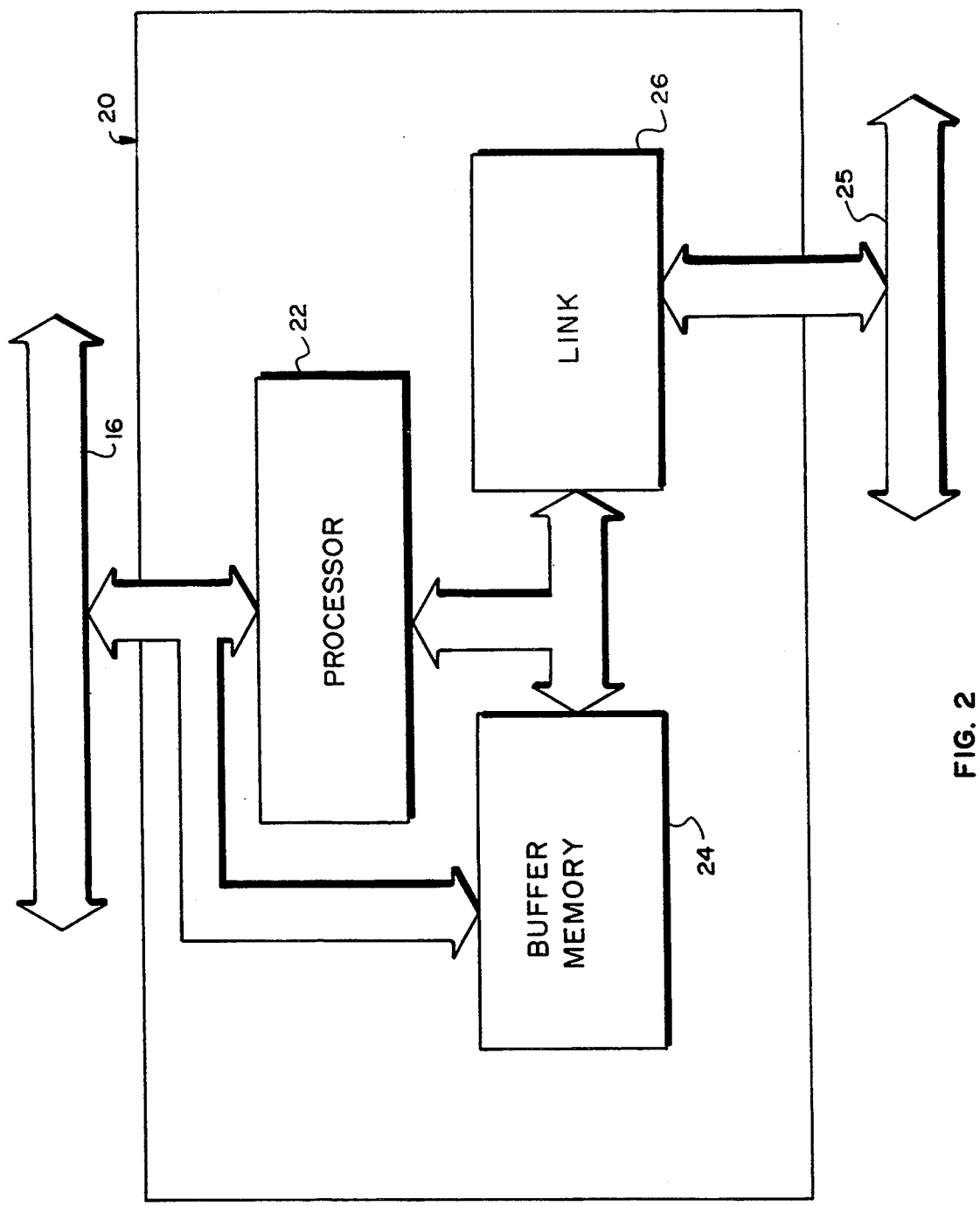
FIG. 2 is a diagram of the I/O port adapter of FIG. 1.

As shown in FIG. 2, the port adapter 20 may include a processor 22, a buffer memory 24 and a link 26. The processor 22 performs read and write operations in data structures in the host memory 14 (FIG. 1) that are used to efficiently identify and organize information exchanged with the driver 18. Accordingly, to perform its operations, the processor 22 communicates with the host memory 14, and controls the buffer 24 and link 26. The buffer memory 24 functions as a "cache" to provide temporary storage of information normally resident in host memory 14; that information may then be quickly accessed by the processor 22 without referencing the host memory 14. The link 26 typically comprises state devices and transceivers that physically connect the port adapter to the interconnect medium 25. In addition, the link is typically responsible for implementing the lower levels of the interconnect medium protocol and moving information between the medium 25 and buffer memory 24.

Figure 3:
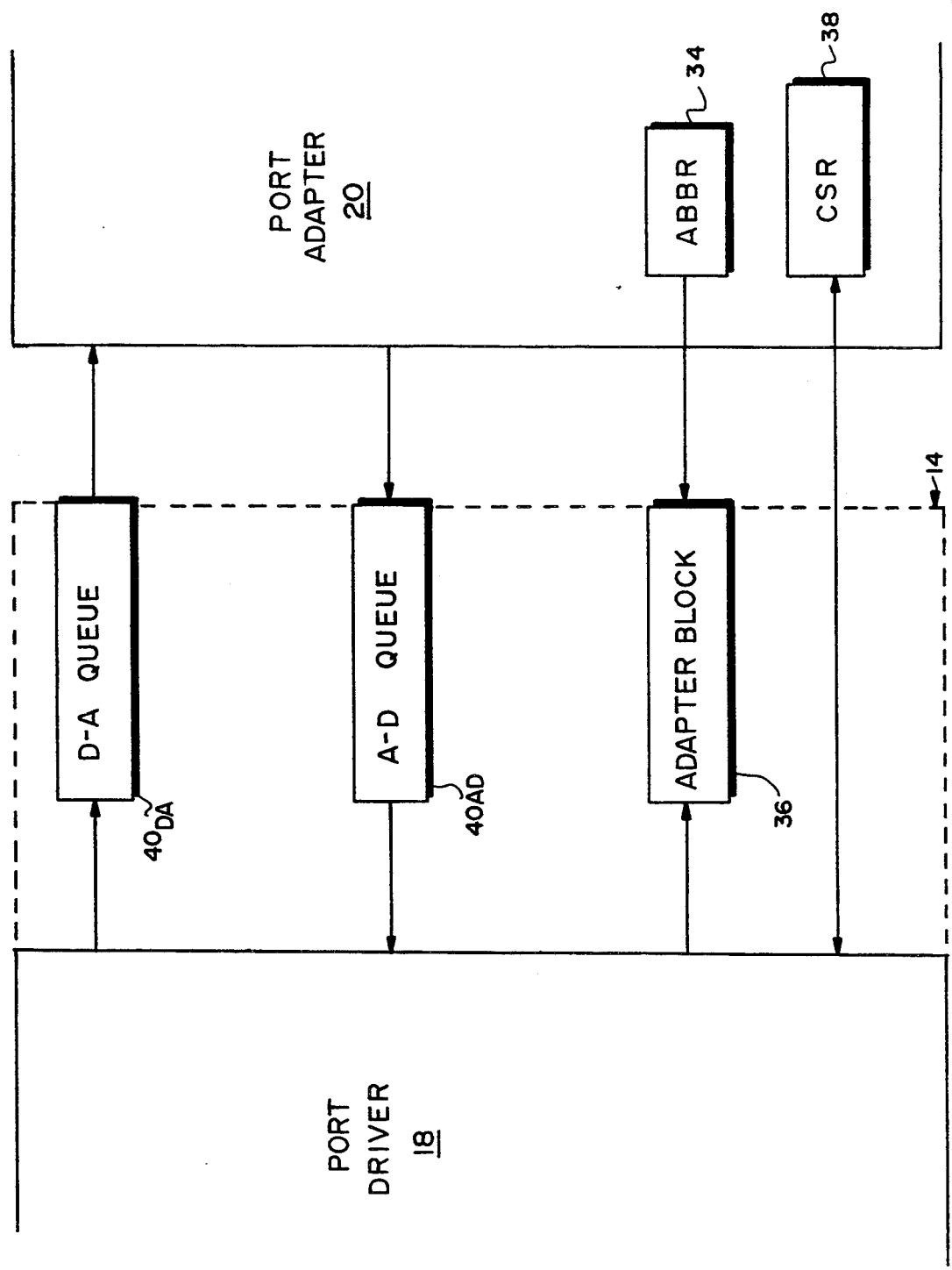
FIG. 3 is an architectural diagram of a communication interface used to pass messages and responses between the port driver and port adapter.

FIG. 3 depicts a logical interface for exchanging information between the driver 18 and the port adapter 20. As can be seen, and as will be described in detail shortly, the interface may comprise various data structures located in the host memory 14 and may include registers located in the port adapter 20. Specifically, the structures include: (i) at least one driver-adapter (D-A) queue $40_{DA}$ used by the port driver to pass messages to the adapter; (ii) at least one adapter-driver (A-D) queue $40_{AD}$ used by the port adapter to pass responses to the port driver; (iii) an adapter block (ADAPTER BLOCK) 36 comprising a data structure used by the port adapter and port driver to locate all structures and containing D-A and A-D queue headers and other control information; (iv) an adapter block base register (ABBR) 34 comprising a register containing the host memory physical address of the adapter block 36; and (v) control/status registers (CSR) 38 used by the port driver to convey initialization and control information to the port adapter, and used by the adapter to convey interrupt and error status information to the port driver. Portions of the adapter block 36 and queues are preferably resident in host memory 14, but they may be copied to the port adapter buffer memory 24 (FIG. 2). The addresses of the ABBR register 34 and CSR registers 38 are preferably in the port adapter I/O address space.

Figure 4A:
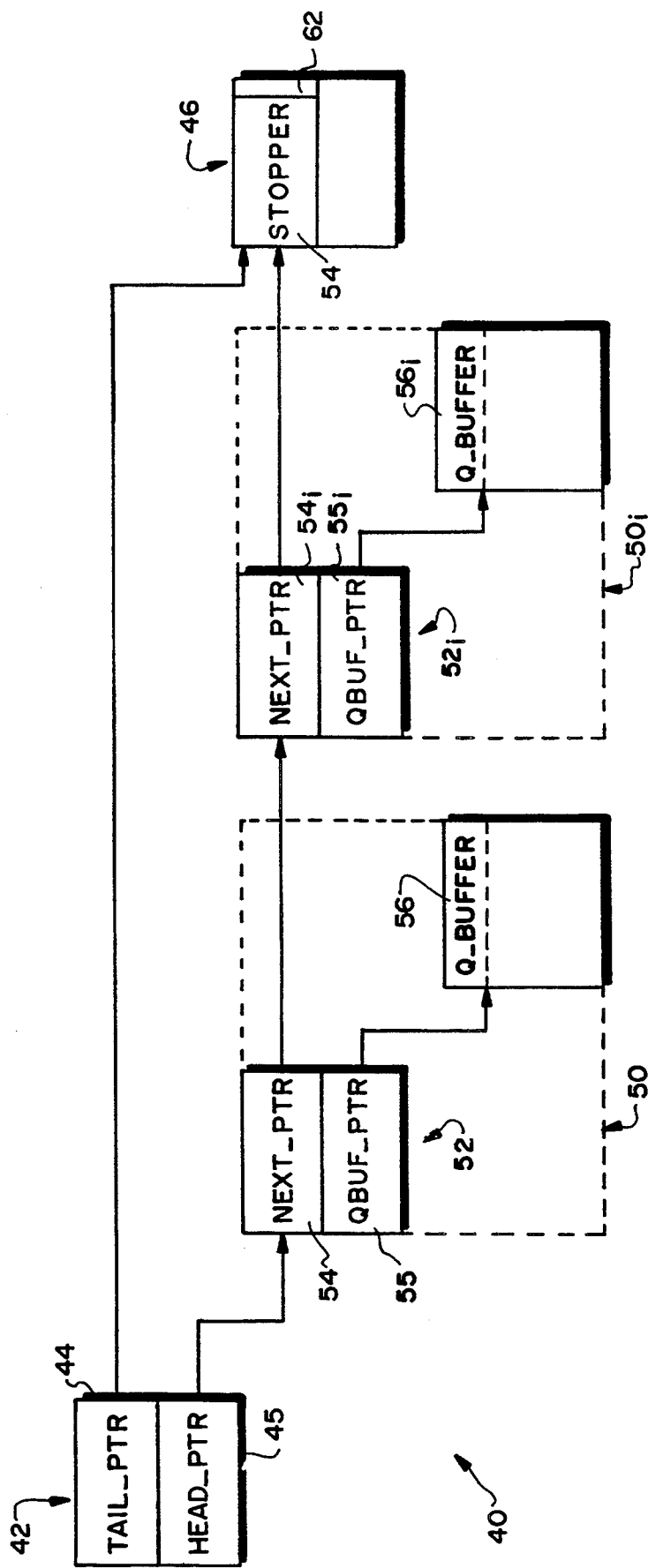
FIG. 4A is a diagram of an embodiment of the singly-linked queue in accordance with the invention.
Figure 4B:
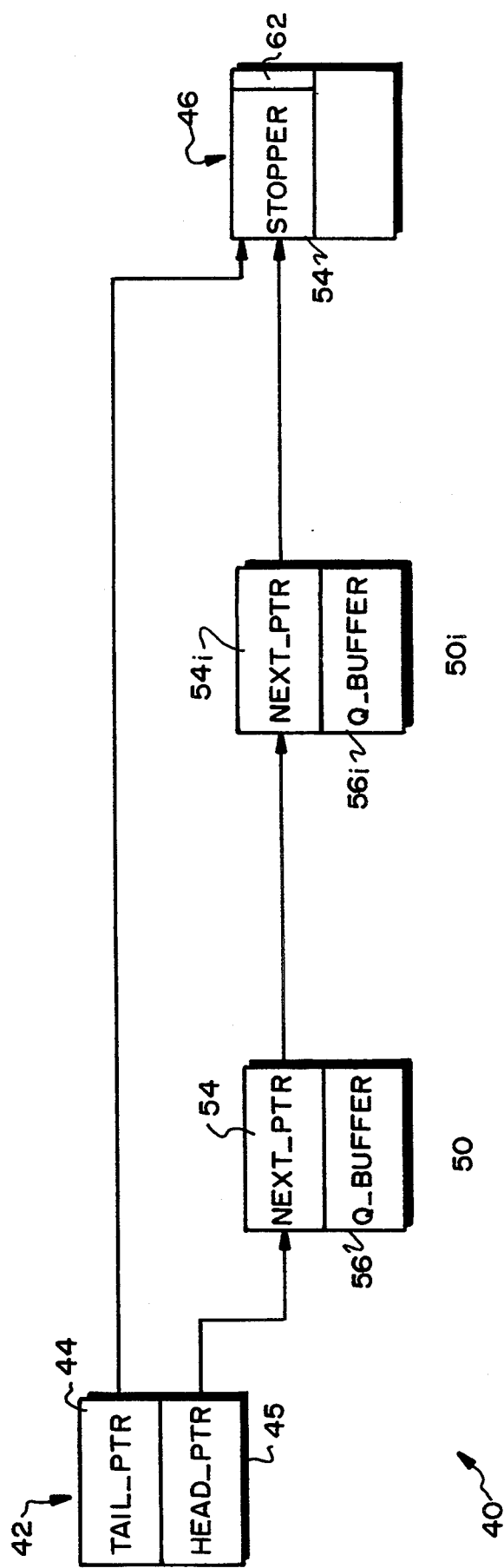
FIG. 4B is a diagram of an alternate embodiment of the singly-linked queue in accordance with the invention.

In accordance with the present invention, communication between the port driver 18 and port adapter 20 is primarily accomplished via a singly-linked queue located in host memory 14 and used to exchange information between the driver and adapter. FIGS. 4A and 4B are diagrams of singly-linked queues, designated generally at 40, each of which may be implemented as a D-A queue, an A-D queue, or any other type of queue, such as an adapter-to-adapter (A-A) queue that is used by the port adapter 20 for internal message entry storage. In general, each queue 40 may comprise a queue header 42, message entries 50, 50i and a stopper entry 46. The queue header 42 preferably includes a tail pointer, TAIL_PTR 44, containing an address referencing the stopper located at the end of the queue and a head pointer, HEAD_PTR 45, containing an address referencing the first entry located at the beginning of the queue.

A message entry 50, 50i may comprise addressable storage locations in host memory 14 used to identify and organize information exchanged between the port driver and adapter. Each message entry, generally designated 50, includes a carder 52, 52i and may include a queue buffer, Q_BUFFER, 56, 56i. Each carrier, generally designated 52, may comprise addressable storage locations in host memory 14 that provide a means for storing a forward link pointer, NEXT_PTR 54, which references the next entry 50i in the queue 40. Each Q_BUFFER, generally designated 56, may also comprise addressable storage locations in host memory 14 that contain the control information relating to a specific message or response that is exchanged between the adapter and driver. In one embodiment of the invention as shown in FIG. 4B, the Q_BUFFER may be integrated into the carrier structure; alternately, as shown in FIG. 4A, each carder 52 may also contain a pointer, QBUF_PTR 55, which points to the Q_BUFFER 56. In this latter embodiment, the carder and Q_BUFFER are separate structures to permit independent reuse; the carrier 52 thus provides a singly-linked structure that also links the information contained in the Q_BUFFER 56 into the queue 40.

The stopper entry 46 identifies the end of the queue 40. In accordance with the invention, the stopper entry 46 allows the port driver 18 and port adapter 20 to concurrently insert and remove message entries of the singly-linked queue 40 in a reliable manner without the use of any external synchronization mechanism, such as an interlock bit. This is possible, in part, because the stopper 46 is one entry beyond the last message entry 50i. At this point, it should be noted that the queue mechanics described herein require a stopper entry 46 in a queue 40 before a first message entry 50 is inserted onto the queue. This is because the NEXT_PTR 54 in each carrier 52 contains the address of the next entry in the queue. Thus, a stopper entry 46 is included on every queue 40, even if there are no message entries currently on the queue. In this latter case, the HEAD_PTR 45 and TAIL_PTR 44 have someplace to point, i.e., to the stopper entry 46, even when the queue is empty.

Each stopper entry 46 may be generally similar in structure to a message entry 50, yet it is not a valid message entry, i.e., it is not used to transmit messages or responses. Therefore, a stopper entry 46 does not include a Q_BUFFER 56 or a QBUF_PTR 55. It does, however, include a pointer similar to the forward link pointer, NEXT_PTR 54. Further, the stopper 46 is identified by the state of a valid indicator, e.g., at least one bit of the NEXT_PTR 54, which is clearly distinguishable from a valid address in the NEXT_PTR 54 of a message entry 50. In a preferred embodiment of the invention, the state of the least significant bit $<0>$ in the NEXT_PTR 54 may identify the entry as a stopper 46 because that bit, which is not an address bit, facilitates a convenient test point as described further below; yet, it is to be understood that other indicators, such as the most significant bit or a particular value for all bits of the pointer 54, may be used for such purpose.

FIG. 5A illustrates the various fields of a forward link pointer, NEXT_PTR 54, of the singly-linked queue 40. The value stored in the "valid indicator" field 62, NEXT_PTR bit $<0>$, is inverted depending upon the type of entry and queue. For example and referring also to FIGS. 3 and 4, a non-stopper entry 50 in the D-A queue $40_{DA}$ may have NEXT_PTR bit $<0>=1$; a stopper entry 46 in this queue may have NEXT_PTR bit $<0>=0$. In contrast, a non-stopper entry 50 in the A-D queue $40_{AD}$ may have NEXT_PTR bit $<0>=0$ and stopper entry 46 may have NEXT_PTR bit $<0>=1$. In general, the indicator is considered "asserted" when the state of the bit $<0>$ indicates a non-stopper entry 46.

Whenever the valid indicator indicates a non-stopper entry, the entry may be removed from the queue as described below. This convention permits the port driver 18 and port adapter 20 to detect stopper entries 46 by a simple logical bit comparison. Also, as will be described further herein, the convention permits the port adapter 20 to reuse a carrier 52 as a stopper entry 46 without modifying the carrier.

Referring again to FIG. 4A, each queue 40 is shared by the port adapter 20 and port driver 18; however, only one, a "remover", can remove entries from the queue; the other, an "inserter", inserts entries. Moreover, the remover and inserter can access the queue 40 only at designated points, i.e., the inserter accesses only by means of the TAIL_PTR 44 and the remover accesses only by means of the HEAD_PTR 45. In accordance with the invention, the port adapter 20 is the remover for the D-A queue $40_{DA}$ and the inserter for the A-D queue $40_{AD}$. The port driver 18 is thus the inserter for the D-A queue $40_{DA}$ and the remover for the A-D queue $40_{AD}$. After initialization of the port adapter 20, the driver 18 and adapter may keep separate, designated copies of the queue header pointers 44 and 45. In other words, the port adapter 20 may move the initial value of the D-A queue HEAD_PTR and the A-D queue TAIL_PTR into its local buffer memory 24 and maintain it there thereafter. The use of separate, designated pointers directly reduces the frequency of host memory references by the adapter to update the TAIL_PTR, while also reducing possible CPU-adapter cache contention for a shared resource.

In a preferred embodiment of the invention, the head pointer HEAD_PTR 45 of the D-A queue $40_{DA}$ is located in the adapter block 36. The starting address of the adapter block 36 in host memory 14 is loaded into the ABBR register 34 at initialization. It is to be understood that in another embodiment of the invention, the location of the adapter block 36 in host memory may be specified such that the port adapter does not need the ABBR register 34 to locate the block 36. Upon locating the adapter block 36, the port adapter 20 copies the HEAD_PTR 45 into its buffer memory 24. The HEAD_PTR 45 "points" to the first entry in the queue $40_{DA}$. When the driver 18 inserts a message entry into the D-A queue $40_{DA}$, the port adapter 20 may be notified via one of the CSRs 38, e.g., an insertion register. FIG. 5B depicts the format of the various fields of an insertion register 130. Specifically, the driver 18 performs a write operation to store the address of the new stopper entry 46 in field 132 of the register 130. Alternately, the driver may write a particular value to the field 132 that "signals" the port adapter to "poll" each entry of the queue to determine whether the entry is a stopper entry 46, i.e., whether the stopper bit 62 (FIG. 5A) is asserted. Alternately, the adapter (and driver) may poll each entry of the queue on its own, when it is free from other processing duties.

Figure 6A:
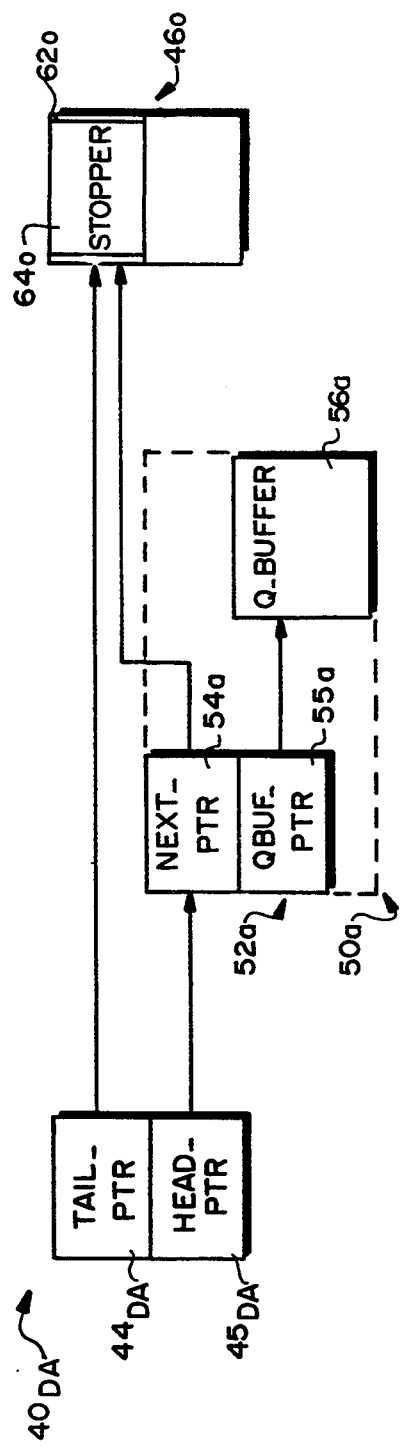
FIGS. 6A-E are diagrams illustrating the insertion of an entry onto a singly-linked queue.
Figure 6B:
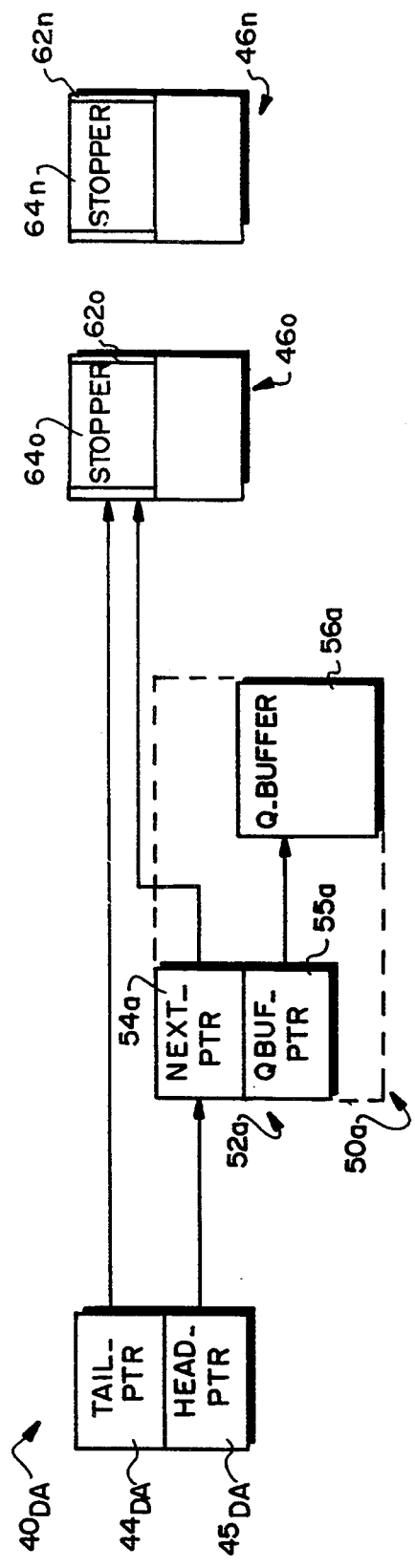

In general, an entry is inserted into a queue by adding a "new" stopper entry 46 and transforming the "old" stopper into an active queue entry 50. FIGS. 6A–E are diagrams illustrating the insertion of an entry onto a singly-linked queue, such as D-A queue $40_{DA}$. In FIG. 6A, entry 50a is an active message entry linked within the queue $40_{DA}$ and containing a NEXT_PTR 54a of carrier 52a to the stopper entry 46o. As driver 18 identifies this location from the TAIL_PTR $44_{DA}$. In FIG. 6B, noted, a new message entry is inserted at the tail of the queue; the port the driver 18 allocates another stopper entry 46n having a non-asserted valid indicator 62n via a write operation in host memory 14; it then transforms the previous stopper entry 46o into a new entry, designated 50b in FIGS. 6C–E, again via a write operation.

Figure 6C:
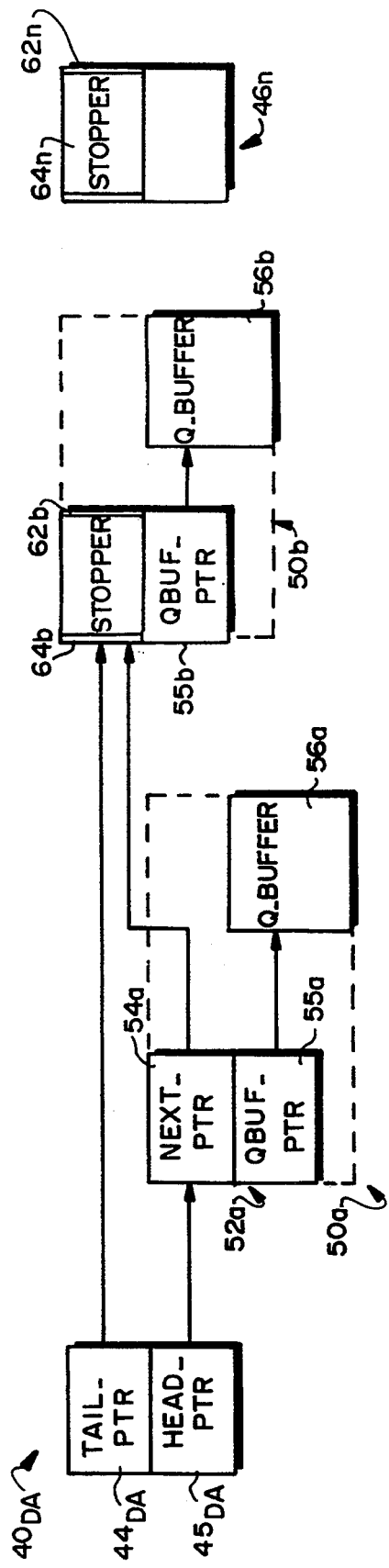
Figure 6D:
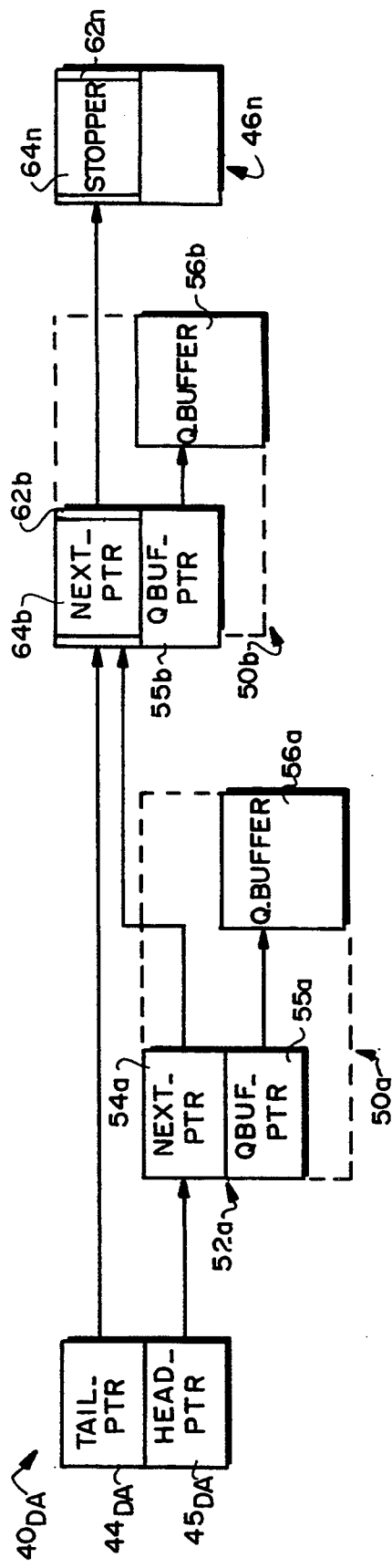
Figure 6E:
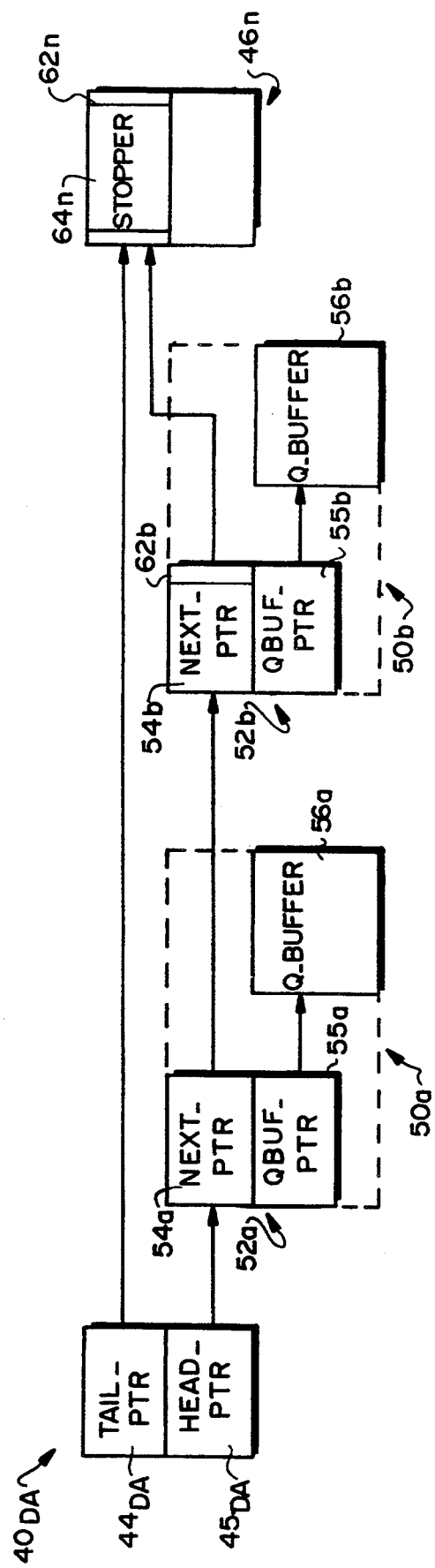

In FIG. 6C, the address contents of the QBUF_PTR 55b are inserted to point to the appropriate Q_BUFFER 56b in host memory 14. Then in FIG. 6D, the contents of the address field 64b (see field 64 of FIG. 5A) of the entry 50b are altered to point to the stopper 46n. To complete the transformation process, the driver 18 configures the valid indicator 62b to indicate that the entry is now a message entry 50b. The indicator 62b is configured last because it is possible that entry 50b may have been accessed by the port adapter 20 prior to updating the necessary information. In general, once an entry is made valid, i.e., the indicator 62 is asserted, the port adapter 20 can remove it from the queue. In order to avoid a situation where incorrect information is retrieved, the driver 18 maintains the new entry 50b as a stopper until all the other fields of the new entry have been updated. This also prevents simultaneous contention for the entry. Therefore, if the port adapter 20 examines the entry 50b prior to it being completely updated by the driver 18, the port adapter 20 interprets the entry as a stopper. Lastly, the address contents of the TAIL_PTR $44_{DA}$ are updated by the driver 18 in FIG. 6E to point to the new stopper 46n. The timing of this latter step is not critical because only the driver 18 accesses the pointer $44_{DA}$.

An entry 50 may be "removed" from the queue 40 by performing a read operation to acquire the contents of the entry. The entry is removed only if it is an active entry, i.e., not a stopper entry. A stopper entry may be identified by either examining the valid indicator or comparing the entry's forward link pointer, e.g., NEXT_PTR 54, to a known stopper address. As an example of the latter and referring again to FIGS. 4 and 5B, the port adapter 20 removes the message entries 50, 50i from the queue until the address in its locally-maintained HEAD_PTR 45 equals the address of the stopper entry 46 located in field 132 of insertion register. It should be noted that the message entries are removed in first-in, first-out (FIFO) order, i.e., the port adapter 20 must remove the entries 50, 50i in sequence.

Figure 7A:
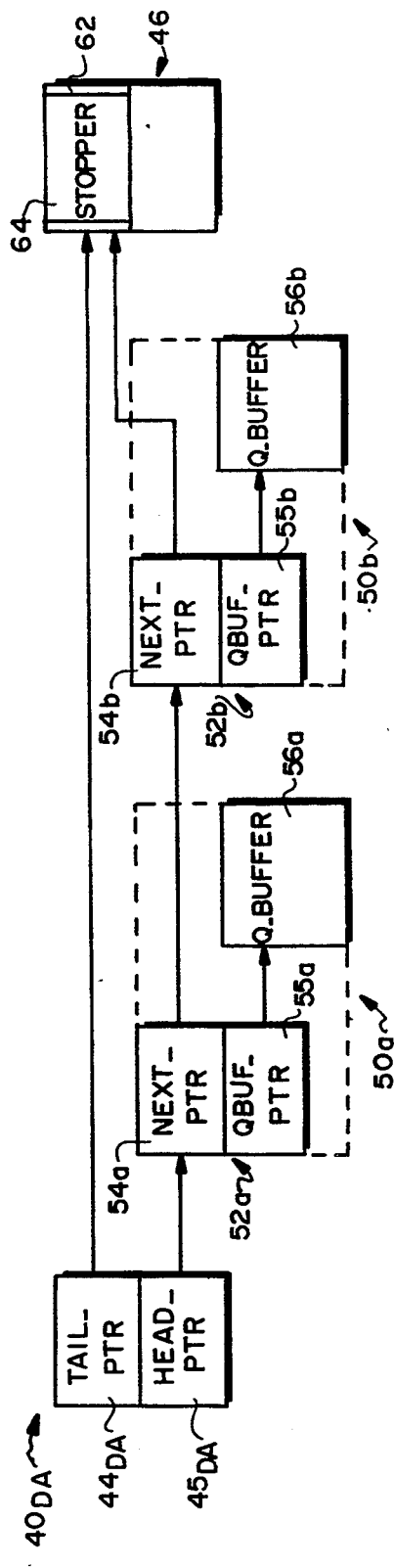
FIGS. 7A-B are diagrams illustrating the removal of an entry from a singly-linked queue.
Figure 7B:
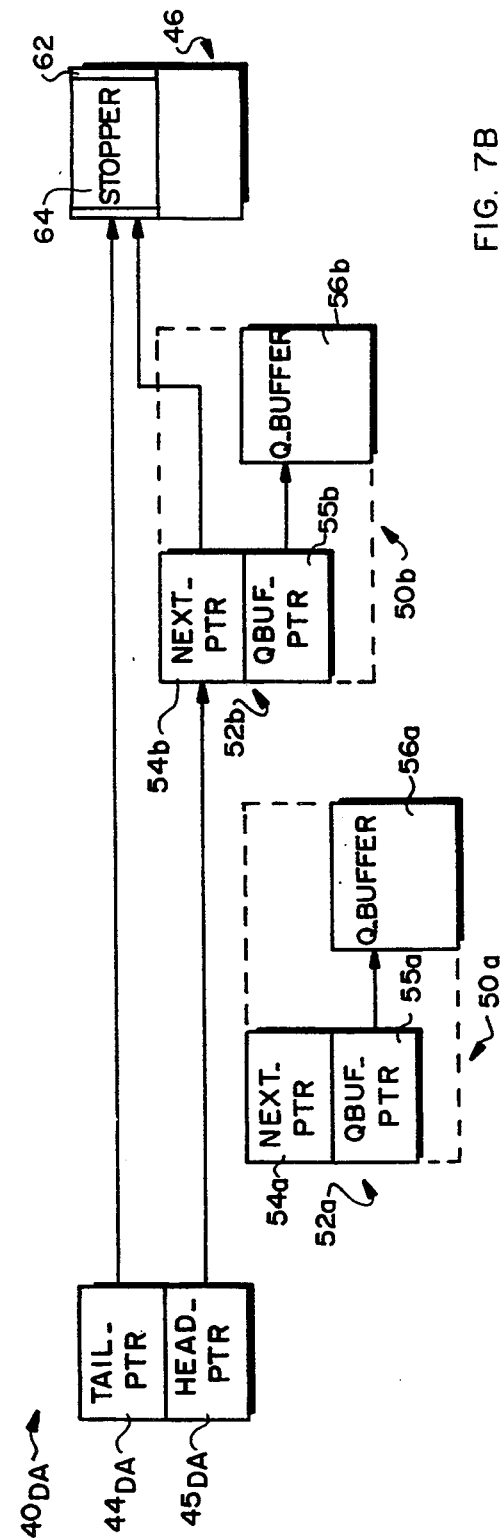

FIGS. 7A–B are diagrams illustrating the removal of an entry from a singly-linked queue, such as D-A queue $40_{DA}$. Initially, the queue $40_{DA}$ contains two message entries 50a and 50b, with the HEAD_PTR $45_{DA}$ pointing to the first entry 50a. As noted, the port adapter 20 is the remover for the D-A queue $40_{DA}$ and thus may access the queue only by means of the HEAD_PTR $45_{DA}$. Specifically, the adapter performs a read operation in the carrier 52a of the entry 50a in host memory 14 to acquire its contents, as described further below in connection with FIGS. 8A–E. The port adapter then modifies the contents of the HEAD_PTR $45_{DA}$ to point to the address of the next entry 50b. This completes the removal process.

Figure 8B:
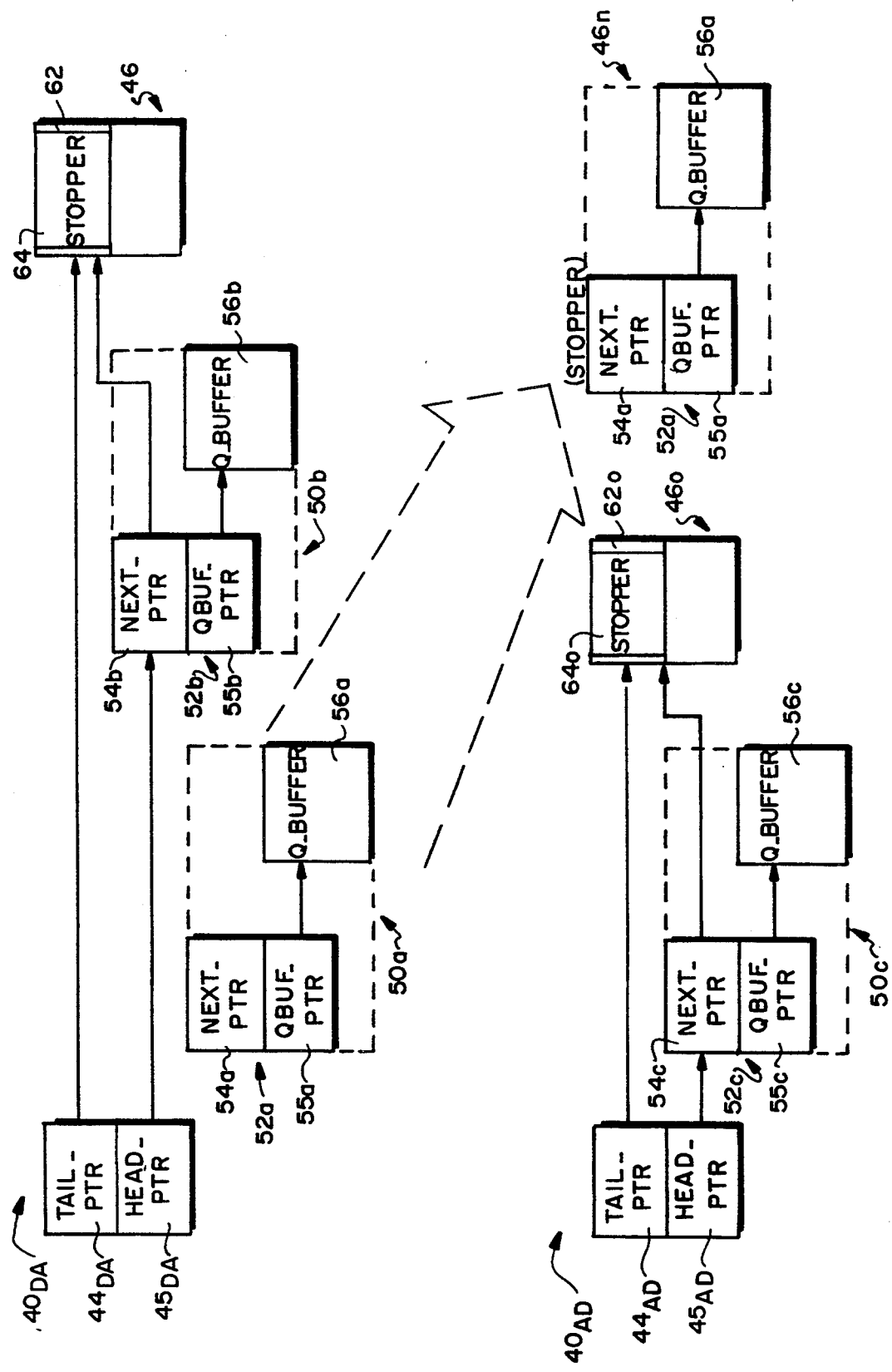

In accordance with the invention, only three host memory references by the port adapter are needed to remove a message entry from a singly-linked queue and subsequently return a response to the driver by inserting an entry on another singly-linked queue. To illustrate such a cycle, refer to FIGS. 8A–E. In FIG. 8A, the HEAD_PTR $45_{DA}$ references the oldest entry 50a in the D-A queue $40_{DA}$, while the TAIL_PTR $44_{AD}$ references the stopper 46 of the A-D queue $40_{AD}$. To remove a message entry from the D-A queue, the port adapter 20 performs a single read operation in the carrier 52a of the entry 50a in host memory 14 (see FIGS. 7A–B). The read operation copies the contents of the carrier 52a, i.e., the NEXT_PTR 54a and the QBUF_PTR 55a, into the port adapter's buffer memory 24. These pointers are used to locate the next message entry 50b and the current Q_BUFFER 56a. The adapter then performs a read operation at the Q_BUFFER 56a to acquire the specific message and execute it.

Later in FIG. 8B, the port adapter completes the removal process by changing the contents of the HEAD_PTR $45_{DA}$ to point to the address of the next entry 50b. If the port adapter determines that the message should generate a response acknowledging processing of the message, the port adapter 20 uses the removed message entry 50a to respond to the driver 18 (see dotted arrow). This is possible because the valid indicator is inverted between the D-A and A-D queues. Specifically, the removed carrier 52a becomes the new A-D queue stopper 46n without having to modify the valid indicator. In accordance with a feature of the invention, this optimization technique eliminates a write operation.

Figure 8C:
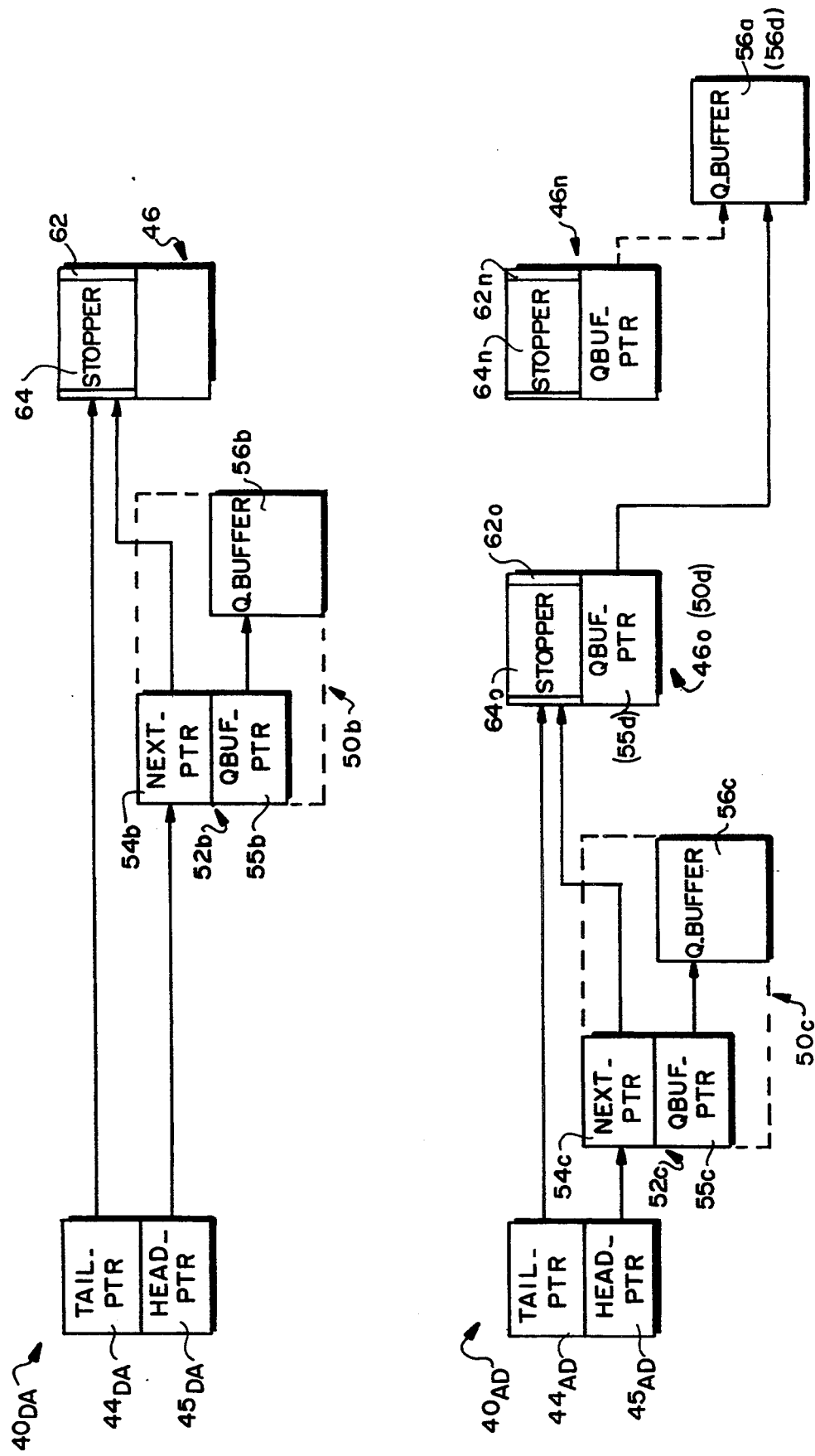
Figure 8D:
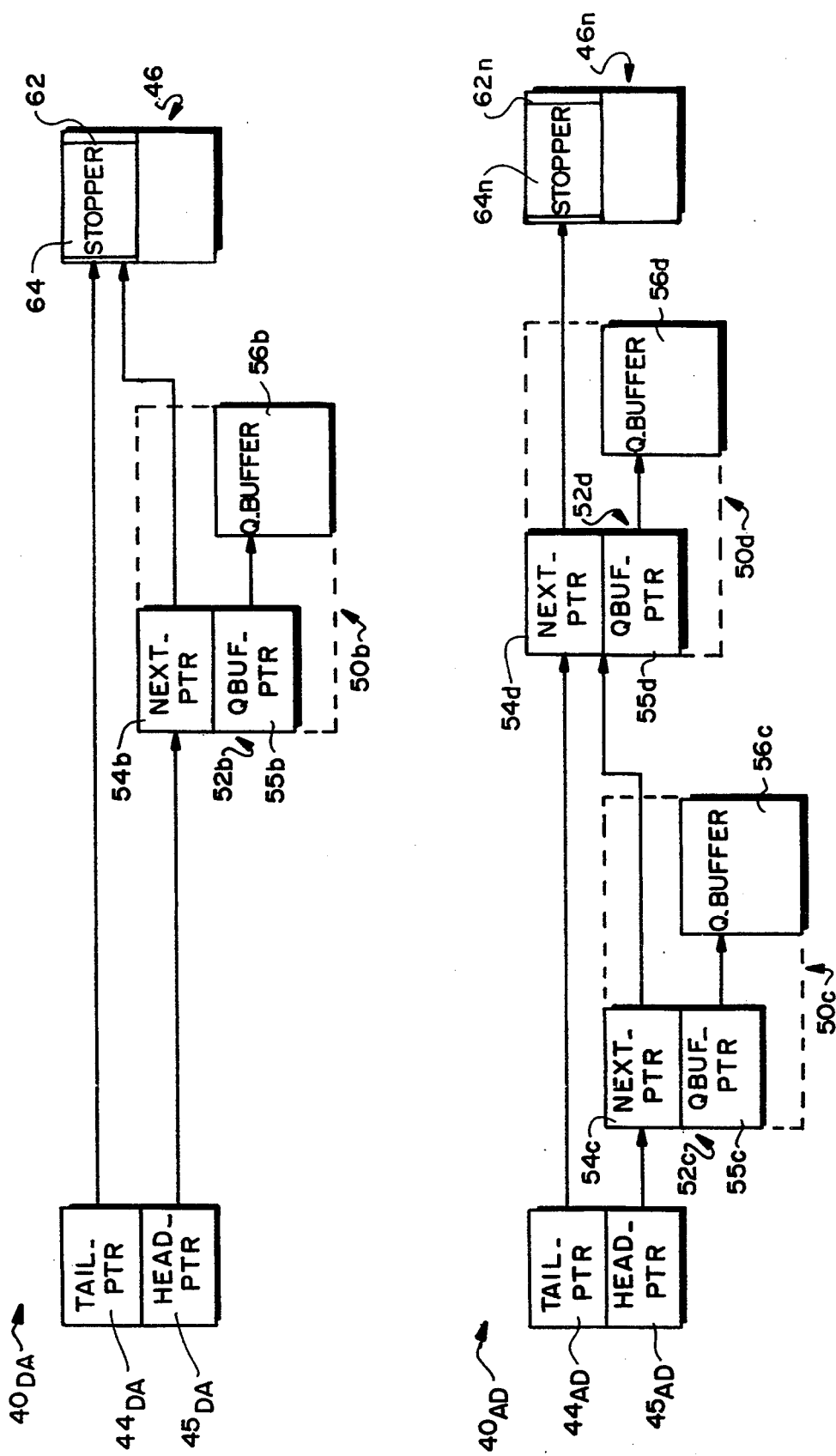
Figure 8E:
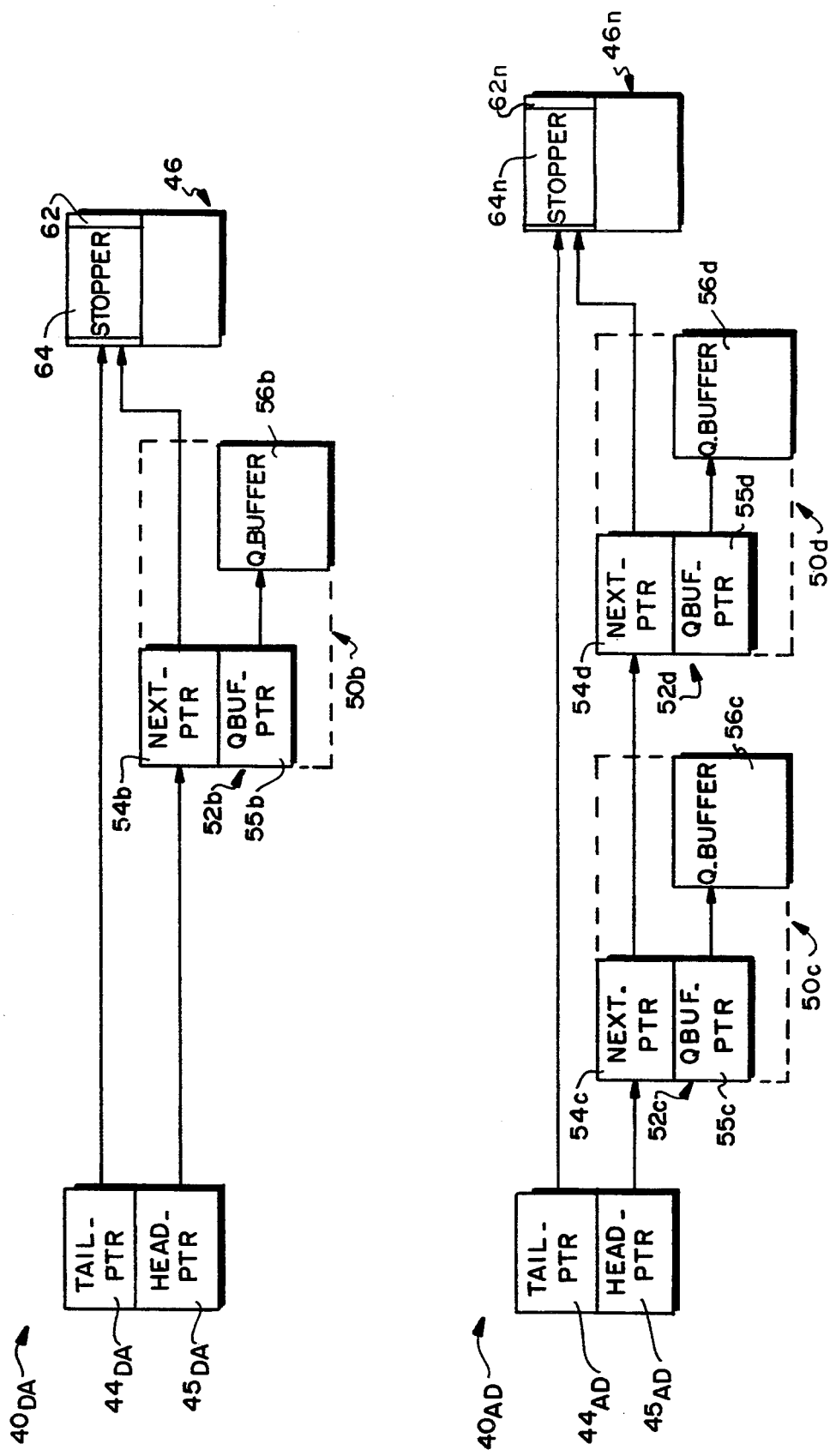

Additionally, the port adapter 20 performs a write operation in the stopper entry 46o on the A-D queue $40_{AD}$ to insert pointers into the stopper 46o in host memory 14; this transforms the "old" stopper 46o into a "new" response entry 50d. The process is illustrated in FIGS. 8C–E. In FIG. 8C, a QBUF_PTR, designated 55d, is inserted into entry 46o to reference the Q_BUFFER 56a associated with the message entry 50a removed from the D-A queue $40_{DA}$; the Q_BUFFER thus becomes 56d. Meanwhile in FIG. 8D, a forward link pointer, designated NEXT_PTR 54d, is inserted to reference the "new" stopper 46n. Finally in FIG. 8E, when the port adapter 20 updates the TAIL_PTR $44_{AD}$ to point to the new stopper 46n, the cycle is completed using a total of three host memory references by the port adapter 20.

The singly-linked queue described herein provides a number of features and advantages as compared with previously known communication data structures. Specifically, the port adapter need perform only two host memory accesses for queue manipulation, i.e., removal and insertion of an entry, and one additional access to process the entry; known interlock queues typically have required many more serialized memory references to insert an entry onto and remove an entry from a queue. The singly-linked queue reduces the possibility of cache contention because the queue entries are typically located at non-contiguous memory addresses. This represents an improvement over known ring implementations that tend to evoke cache contention caused by simultaneous access by the port driver and port adapter to physically contiguous entries. Also, the non-contiguous memory arrangement of the singly-linked queue conserves total memory resources because the driver can dynamically allocate and deallocate message entries during process execution.

As previously noted, the carrier and Q_BUFFER of the singly-linked queue may be integrated into a single structure or they may be separate structures and, therefore, permit independent reuse. In the latter arrangement, to respond to a message entry issued by the port driver, the port adapter need only update the forward link and Q_BUFFER pointers of a stopper entry in the A-D queue; it then becomes a response entry, while the D-A carrier entry becomes the A-D queue stopper. In addition, separate carrier and Q_BUFFER structures preclude the need for the port adapter to copy the entire Q_BUFFER contents into the old A-D queue stopper entry, thereby minimizing the number of host memory-to-host memory copies of control information by the port driver, i.e., only the carrier pointers need be returned to the A-D queue. This is particularly advantageous when a Q_BUFFER is typically large, e.g., 100-200 bytes.

The normal execution code for a ring must include provisions to compute ring overrun; this translates into additional overhead for the driver and adapter, which is not present in the singly-linked queue described herein. In addition, because no external synchronization mechanism, e.g., an interlock, is needed to ensure reliable insertion and removal of message entries on the singly-linked queue, no lengthy, time-consuming atomic access, such as a read-modify-write operation, is required as with prior interlocked queues.

The foregoing description has been directed to specific embodiments of this invention. It will be apparent, however, that variations and modifications may be made to the described embodiments, with the attainment of some or all of its advantages. Therefore, it is the object of the appended claims to cover all such variations and modifications as come within the true spirit and scope of the invention.

What is claimed is:

1. Apparatus for exchanging information between a port driver operating system program and a port adapter, said apparatus comprising:
   (A) singly-linked queue means located in host memory for inserting and removing said information exchanged between said driver and said port adapter, said queue means having a beginning portion and an end portion and further comprising:
   carrier means for storing said information for exchange between said driver and said port adapter;
   first stopper means for referencing said end portion of said queue means and including indicator means adapted to be asserted for distinguishing said stopper means from said carrier means; and
   means for referencing said beginning portion of said queue means;
   (B) means for inserting said carrier means at said end portion of said queue means; and
   (C) means for removing said carrier means from said beginning portion of said queue means so that said information contained in said carrier means is exchanged between said driver and said port adapter without the use of an external synchronization mechanism.

2. The apparatus of claim 1 wherein said removing means comprises:
   means for examining said indicator means to distinguish said carrier means from said first stopper means; and
   means for retrieving said information when said indicator means identifies said carrier means.

3. The apparatus of claim 2 wherein said retrieving means comprises means for reading said information by one of said port adapter and said port driver.

4. The apparatus of claim 3 wherein said inserting means comprises:
   means for allocating second stopper means in said host memory; and
   means for transforming said first stopper means into said carrier means, such that said second stopper means identifies said end portion of said queue means.

5. The apparatus of claim 4 wherein said transforming means comprises:
   means for altering a forward pointer located in said first stopper means to point to said second stopper means; and
   means for asserting said indicator means to complete transformation of said first stopper means into said carrier means.

6. The apparatus of claim 5 wherein
   said altering means comprises means for writing an address of said forward pointer by one of said port adapter and said port driver; and
   said asserting means comprises means for writing said indicator means by one of said port adapter and said port driver.

7. The apparatus of claim 2 wherein said indicator means is also located within said carrier means.

8. In a host computer including a central processing unit (CPU), a host memory and an port adapter having a buffer memory, singly-linked queue apparatus for use in exchanging information between a port driver operating system program executed by said CPU and said port adapter, said singly-linked queue apparatus comprising:
   a plurality of message entries located in said host memory each including a carrier containing a valid address referencing a next one of said entries and said information for exchange between said driver and said port adapter;
   a queue header located in one of said host memory and said buffer memory, said queue header including a head pointer containing a valid address referencing a first one of said entries;
   a first stopper entry containing a first pointer having a first indicator adapted to be asserted and distinguishable from said valid addresses contained in said carriers of said plurality of message entries, said first stopper entry referenced by a valid address contained in one of a last of said carriers of said plurality of message entries and said head pointer;
   a second stopper entry containing a second pointer having a second indicator adapted to be asserted and distinguishable from said valid addresses contained in said carriers of said plurality of message entries;

means for altering said first pointer of said first stopper entry to reference said second stopper entry; and means for asserting said first indicator to transform said first stopper entry into one of said plurality of message entries so that said information contained in said message entries are presented for exchange between said driver and said port adapter without the use of an external synchronization mechanism.

9. The singly-linked queue apparatus of claim 8 wherein:

said altering means comprises means for writing an address of said first pointer by one of said port adapter and said port driver; and said asserting means comprises means for writing said first indicator by one of said port adapter and said port driver.

10. The singly-linked queue apparatus of claim 9 wherein said information for exchange between said driver and said port adapter is contained in a queue buffer of each of said message entries, and wherein said carrier further contains a queue buffer pointer to said queue buffer.

11. In a host computer including a central processing unit (CPU), a host memory and an port adapter, a method for exchanging information between a port driver operating system program executed by said CPU and said port adapter, said method comprising the steps of:

storing said information in message entries of a singly-linked queue for exchange between said driver and said port adapter;

referencing an end of said queue with a first stopper entry characterized as an entry beyond a last of said message entries, said first stopper entry containing an invalid address;

distinguishing said first stopper entry from said message entries with an indicator adapted to be asserted, said indicator located in each of said message entries and said first stopper entry;

referencing a beginning of said queue, said beginning identifying an element of information in a first of said message entries to be exchanged;

inserting said last of said message entries at said end of said queue referenced by said first stopper entry; and removing said first of said message entries from said beginning of said queue so that said information contained in said message entry is exchanged between said driver and said port adapter without the use of an external synchronization mechanism.

12. The method of claim 11 wherein said step of removing further comprises the steps of:

examining said indicator to distinguish said first of said message entries from said first stopper entry; and retrieving said information when said indicator identifies said first of said message entries.

13. The method of claim 12 wherein said step of retrieving further comprises the step of reading said indicator by one of said port adapter and said port driver.

14. The method of claim 13 wherein said step of inserting further comprises the steps of:

allocating a second stopper entry in said host memory; and transforming said first stopper entry into another of said message entries, such that said second stopper entry identifies said end of said queue.

15. The method of claim 14 wherein said step of transforming further comprises the steps of:

altering a forward pointer located in said first stopper entry to point to said second stopper entry; and asserting said indicator of said first stopper entry to complete transformation of said first stopper entry into said another of said message entries.

16. The method of claim 15 wherein said steps of altering comprises writing an address of said forward pointer by one of said port adapter and said port driver; and asserting comprises writing said indicator by one of said port adapter and said port driver.

* * * * *